United States Patent [19]

Winkler et al.

[11] 3,965,824

[45] June 29, 1976

[54] BALL DRIVE MECHANISM FOR LOAD SUPPORTING HANGER

[76] Inventors: Robert J. Winkler, 2101 E. Fourth St., Santa Ana, Calif. 92704; James B. Curran, 1509 W. St. Andrews Place, Santa Ana, Calif. 92705

[22] Filed: Dec. 4, 1974

[21] Appl. No.: 529,368

[52] U.S. Cl................................. 104/165; 104/108
[51] Int. Cl.²......................................... B65G 35/08
[58] Field of Search ............... 198/1, 108, 129, 130, 198/154, 158, 189, 203; 104/140, 108, 165; 312/126, 128, 134

[56] References Cited
UNITED STATES PATENTS

| | | | |
|---|---|---|---|
| 2,424,055 | 7/1947 | Rousseau | 198/1 |
| 2,517,444 | 8/1950 | Rousseau | 198/108 |
| 2,877,886 | 3/1959 | Braid | 198/108 |
| 3,160,264 | 12/1964 | Raybould | 198/189 |
| 3,589,785 | 6/1971 | Appleby | 198/158 |

*Primary Examiner*—Richard A. Schacher
*Assistant Examiner*—Robert Saifer
*Attorney, Agent, or Firm*—William C. Babcock

[57] ABSTRACT

A mechanism for moving one or more first load supporting hangers through a predetermined path that is defined by the interior of a hollow longitudinally slotted first frame. Each hanger is rotatably supported from a first ball that is movably supported within the first frame. The interior of the first frame not filled with first balls is filled with second balls. A first wheel that has pairs of spaced lobes on the circumference thereof projects through an opening in the first frame, with the pairs of lobes sequentially engaging the balls when the first wheels is rotated. The first and second balls and the hangers supported from the first balls are moved longitudinally in the first frame as such sequential engagement of the balls takes place. Should it be desired to move a platform having first and second ends through said predetermined path, the first end is connected to the first hanger, and the second end to a second hanger. The second hanger is rotatably supported from a first ball, which first ball together with a number of second balls completely fill a hollow longitudinally slotted second frame that is identical to the first frame and is parallel and laterally spaced from the latter. A second wheel identical to the first wheel and that rotates concurrently therewith sequentially engages the balls in the second frame to move the balls therein in the same direction and at the same rate as the balls in the first frame. By reversing the direction of rotation of the first and second wheels the direction of movement of the first and second hangers and platform extending therebetween may be reversed.

11 Claims, 6 Drawing Figures

U.S. Patent    June 29, 1976    3,965,824
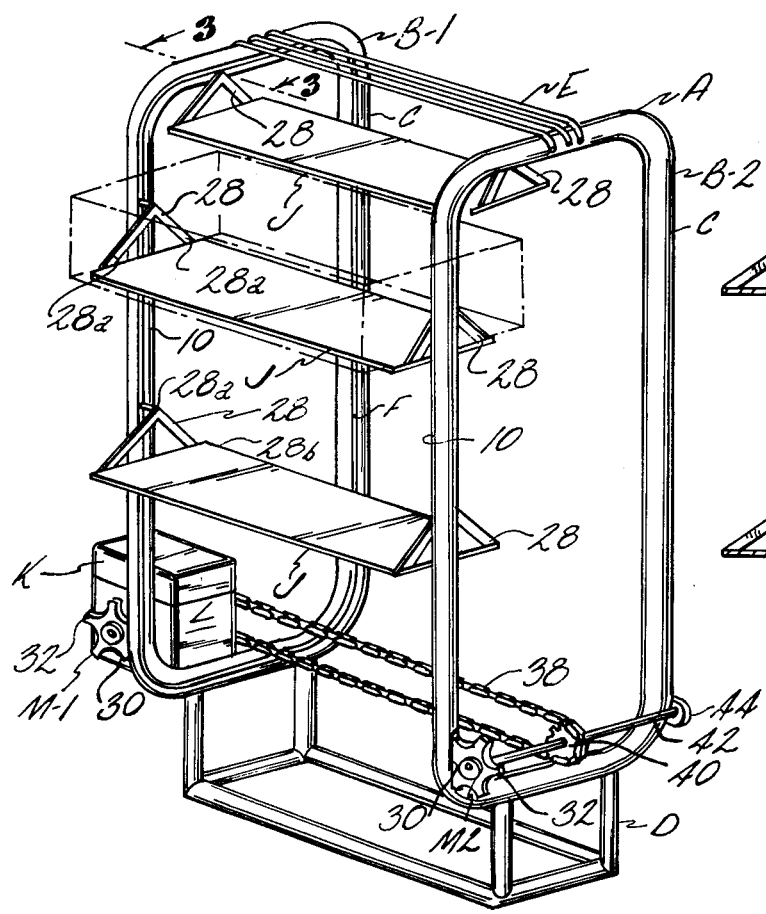
FIG. 1
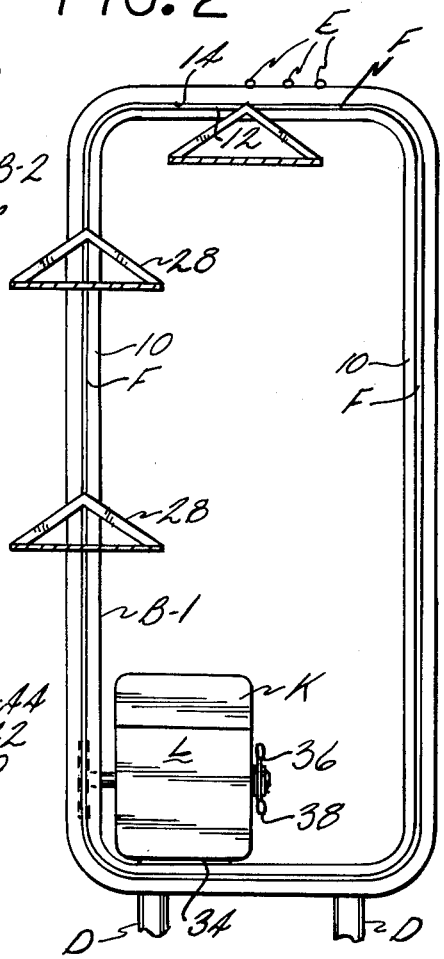
FIG. 2
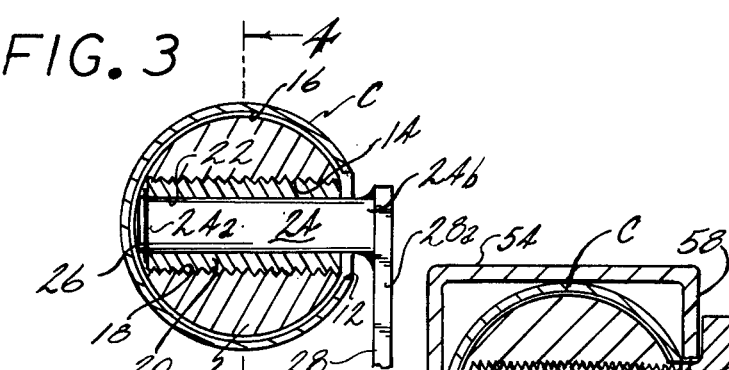
FIG. 3
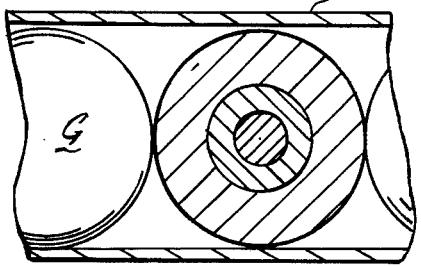
FIG. 4
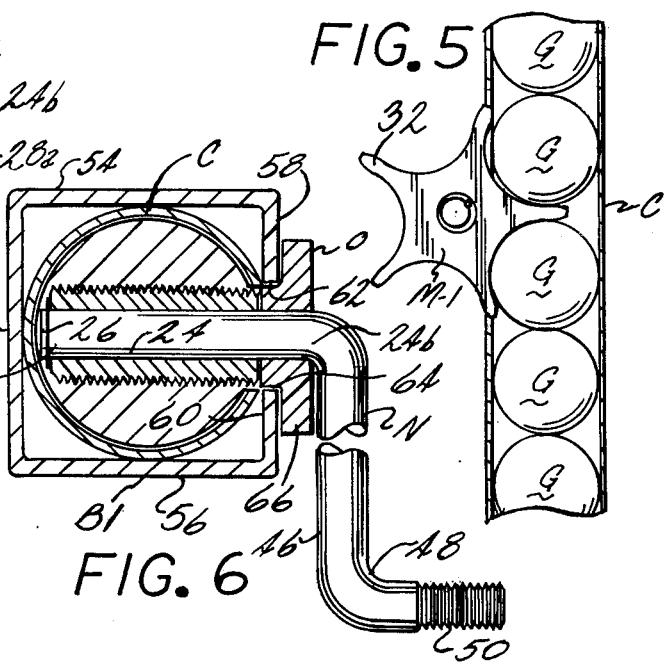
FIG. 5
FIG. 6

BALL DRIVE MECHANISM FOR LOAD SUPPORTING HANGER

BACKGROUND OF THE INVENTION

1. Field of the Invention

Ball drive mechanism for load supporting hanger.

2. Description of the Prior Art

In the past, when it is desired to move either a single hanger or a pair of aligned hanger successively through a predetermined path it has been common practice to use power driven chain belts for this purpose. However, chain belts have certain operational disadvantages for this purpose. The chief operational disadvantages are the need for constant inspection and maintenance, making certain that the belts are adequately lubricated, and the high expense encountered when the belt is to be used to define a circuitous path in which a number of sharp turns are present.

The primary purpose in devising the present invention is to provide a ball drive mechanism that may be used to move either a single hanger or a pair of aligned load supporting hangers in either of two directions through a predetermined path in a manner that is substantially free of the operational disadvantages of prior art devices of this nature.

SUMMARY OF THE INVENTION

The invention in its simplest form includes a mechanism for successfully moving at least one load supporting hanger or member through a predetermined path, with the member including a first shaft of circular transverse cross section. A hollow carrier frame is provided that defines a predetermined endless path within the interior thereof, with the carrier frame having a first side in which a first longitudinal slot is formed, with the slot being defined between first and second longitudinally extending edges of the carrier frame.

A number of first and second balls are disposed side by side within the frame, with the majority of the balls in abutting contact, and each of the first balls having a diametrically extending bore therein that is aligned with the slot and normal to the first and second longitudinal edges. Each of the bores in the first balls is engaged by one of the first shaft to movably support one of the load supporting members from the frame. Retaining means are provided for maintaining the first shaft within the bores of the first balls.

The first shaft preferably rotatably supports flanged guide wheels that have portions thereof situated within the slot, and the flanged wheels preventing transverse rotation of the first balls as they are moved longitudinally in the frame. The first frame has a wheel extending through an opening therein, and this wheel having a number of circumferentially disposed pairs of lobes thereon, with each pair of lobes capable of engaging one of the balls to move the engaged ball and the balance of the balls longitudinally in the first frame as the wheel rotates. A geared down electric motor is supplied for driving the lobe defining wheel, with the motor preferably capable of driving the lobe defining wheel in either of two directions, to permit the first ball member supported therefrom, and the second balls to be moved concurrently in a desired direction relative to the frame.

When it is desired to move a platform having first and second ends through a desired path, the platform has first and second members secured to the first and second ends, and the members having first and second shafts extending outwardly therefrom in opposite directions. The first and second shaft rotatably engage first balls, which first balls together with second balls fill the interior of first and second frame that are parallel and transversely aligned, with both the first and second frames having longitudinal slots formed therein on their adjacent sides.

First and second wheels are concurrently driven at the same rate and in the same direction, and the balls engaged by the wheels are likewise moved concurrently in the first and second frames in the same direction.

Thus, it will be seen that the invention may be utilized with but a single frame, or two frames. When two frames are used, a number of platforms may be supported therebetween, and caused to move through a desired path, which path is determined by the configuration of the frames. The invention above described has the operational advantages that it provides a simple and convenient means of moving either a single or a pair of hangers through a predetermined path, and in either of two possible directions. The invention also has the operational advantage that it is simple and easy to install, requires a minimum of maintenance attention, and the moving parts do not have to be lubricated as is necessary when endless chain belts are used for this purpose.

BRIEF DESCRIPTION OF THE DRAWINGS

FIG. 1 is a perspective view of one embodiment of the invention;

FIG. 2 is an end elevational view of the device shown in FIG. 1;

FIG. 3 is a fragmentary cross sectional view of the device shown in FIG. 1, taken on the line 3—3 thereof;

FIG. 4 is another cross sectional view of the device taken on the line 4—4 of FIG. 3;

FIG. 5 is a fragmentary cross sectional view of a portion of the device taken adjacent the driving motor thereof; and FIG. 6 is a transverse cross sectional view of a modified form of the invention.

DESCRIPTION OF THE PREFERRED EMBODIMENT

An embodiment A of the invention is shown in FIG. 1 that includes first and second endless frames B-1 and B-2 respectively, that are preferably defined by tubing C. The first and second frames B-1, B-2 are supported on a base D. Rigid bars E extend between the upper portions of the frames B-1, B-2 to hold the frames in fixed, parallel, laterally spaced relationship.

The frames B-1, B-2 have first adjacent surfaces 10 in which longitudinal slots F are formed. Each of the slots F is defined by a longitudinal first edge 12 and longitudinal second edge 14 formed in the tubing C. The interior 16 of the first and second frames B-1, B-2 are filled with a number of first balls G and second balls H that are movable therein and the majority thereof in abutting contact.

Each of the second balls H has a diametrically extending, tapped bore 14 therein that is engaged by an externally threaded tubular bushing 20, which bushing has a longitudinal bore 22 therein. Each of the longitudinal bores 22 rotatably engages a first shaft 24 having a first end 24a and second end 24b. The first end 24a is circumferentially grooved and is engaged by a resilient ring 26, to prevent the shaft from inadvertently being displaced from the bore 22. The second end 24b of each shaft 24 is secured to a downwardly extending bracket 28 as may best be seen in FIG. 1. Each pair of brackets 28 as may be seen in FIG. 1 has a horizontal load supporting platform J extending therebetween. The first and second frames B-1 and B-2 have openings 30 formed therein, the purpose of which will be later described. An electric motor K is provided that serves to drive a gear reduction unit L. The gear reduction unit L drives a first wheel M-1 that has a number of circumferentially spaced lobes 32 defined thereon. The motor K is supported by a bracket 34 secured to the lower portion of the first frame B-1. The gear reduction unit L also serves to drive a first sprocket 36 that has an endless chain link belt 38 extending therefrom that engages a second sprocket 40 that is mounted on a shaft 42, which shaft is supported by bearings 44 from the second frame B-2.

The second shaft has a second lobe defining wheel M-2 rigidly secured thereto, which wheel is identical to the wheel M-1, and the second wheel M-2 extending through the opening 30 formed in the second frame B-2. When electric motor K is energized, the wheels M-1, M-2 are driven, and as they rotate, each pair of lobes 32 thereon removably engages one of the first or second balls G or H to move the engaged balls longitudinally in the first and second frames B-1 and B-2, and this movement of the engaged balls being transmitted to the balance of the balls within the confines of the frames B-1 and B-2 to move the brackets 28 and platforms J sequentially through the path defined by the slots F. Brackets 28 as can be seen in FIG. 1 includes two upwardly tapering rigid members 28a that meet at an apex. Each apex defined by members 28a is secured to the second end 24b of one of the shafts 24. The lower ends of the members 24a are secured to the platform J.

Should it be desired, only the first frame B-1 and associated elements may be used. When only the first frame B-1 and associated elements are used, the shaft 24 has the second ends 24b thereof secured to the upper end of a hanger N as shown in FIG. 6, which hanger includes a depending first leg 46 and a second leg 48 extending outwardly therefrom on which threads 50 are provided for engaging a load supporting member (not shown). This member (not shown) may be a box, bucket, or the like. To strengthen the load carrying capability of the first frame B-1, it is desirable that the tube C thereof be disposed within the confines of a channel shaped member that includes a web 52 that has first and second flanges 54 and 56 projecting outwardly therefrom, and the flanges on their outer ends supporting first and second longitudinally extending ribs 58 and 60 that define a second slot 62 therebetween that is in alignment with the first slot F.

The second end 24b of the first shaft 24 rotatably supports a guide wheel O that includes a first cylindrical portion 64 situated within the confines of the slot 62 and a second portion 66 of larger diameter that is disposed outwardly therefrom. The second portion 66 is held in a fixed plane relative to the first and second ribs 58 and 60 by being disposed between the external surfaces of these ribs and the inner surface of the first leg 46. The guide wheels O when mounted on shafts 24 as above described, prevent the second balls H from pivoting transversely in the tube C as the balls and hangers N move longitudinally relative to the first frame B-1. When the first frame B-1 is used, the chain belt 38 and elements associated with the second frame B-2 are dispensed with.

The embodiment A of the invention as shown in FIG. 1 illustrates merely one form in which the ball drive may be used to sequentially move individual brackets 28 or hangers N through a predetermined path.

The use and operation of the invention has been described previously in detail and need not be repeated.

We claim:
1. A mechanism for successively moving at least one load supporting first shaft of circular transverse cross section through a predetermined endless path, said mechanism including:
   a. a hollow carrier frame that defines said predetermined endless path, said carrier frame having a first side in which an endless first slot is formed, said slot being situated between first and second longitudinally extending edges of said carrier frame;
   b. a plurality of first and second balls disposed side by side in said frame, with the majority of said balls in abutting contact, each of said first balls having a diametrically extending bore therein that is axially aligned with said slot and normal to said first and second longitudinally extending edges, and each of said bores rotatably engaging one of said first shafts to movably support one of said load supporting members from said frame;
   c. first means for retaining each of said first shafts in said bores;
   d. second means for preventing transverse rotation of said first balls as said first balls move through said predetermined endless path said second means including a guide wheel rotatably supported on said first shaft, said guide wheel including a first circular portion disposed between said first and second longitudinal edges and a second portion of larger diameter than said first portion that is disposed between said first side and said third means that act as guides for said second portion to prevent said first portion from being disengaged from said slot defined by said first and second longitudinal edges;
   e. a wheel having a plurality of circumferentially spaced lobes thereon, said wheel projecting into the interior of said frame through an opening therein, and said lobes so spaced that when said wheel is rotated pairs of adjacent lobes removably and successively engage each of said first and second balls to move the engaged ball and the balance of said balls and said load supported first shaft through said predetermined endless path; and
   f. power means for rotating said wheel.

2. A mechanism as defined in claim 1 in which said power means is an electric motor that drives a gear reduction unit, and said unit in turn driving said wheel.

3. A mechanism as defined in claim 1 which in addition includes:
   g. a load supporting bracket; and
   h. third means that connect said hanger bracket to the end of said first shaft most remote from said frame.

4. A mechanism as defined in claim 1 in which said first shaft projects through said first ball, said first shaft having a free end portion in which a circumferential groove is formed, and said first means being a resilient clip that removably engages said groove.

5. A mechanism as defined in claim 1 in which each of said first balls has an internally threaded opening extending diametrically therethrough, and said mechanism in addition including;

g. at least one externally threaded tubular bushing, said bushing engaging said internally threaded opening, and the interior of said bushing defining said bore.

6. A mechanism as defined in claim 1 in which said frame is an endless tube in which said first and second balls are disposed.

7. A mechanism as defined in claim 6 in which said frame further includes:

g. a rigid channel shaped reinforcing member that includes a web and first and second flanges projecting therefrom, said tube disposed within said channel shaped member with said slot oppositely disposed from said web; and h. first and second elongate ribs that extend towards one another, said first and second ribs secured to the longitudinal edges of said flanges most remote from said web, and said ribs cooperating to define a second endless slot therebetween that is aligned with said first slot in said tube.

8. A mechanism for moving at least one load supporting rectangular platform having first and second ends in either a first or second direction in a predetermined path, said mechanism including:

a. first and second brackets secured to said first and second ends;

b. first and second shafts that extend outwardly in opposite directions from said first and second brackets;

c. two first balls having diametrically extending bores therein that rotatably engage said first shafts;

d. first and second laterally spaced, parallel, hollow frames that define an endless path within the confines thereof, said first and second frames on the sides adjacent thereto having two laterally aligned first slots therein, said slots defining said path, with said first balls disposed inside said frame, and portions of said first and second shafts on which said first balls are mounted slidably disposed in said slots;

e. a plurality of second balls in said first and second frames on opposite sides of said first balls, said first and second balls completely filling said first and second frames;

f. first means for preventing transverse rotation of said first balls from moving in said first and second frames;

g. first and second wheels having a plurality of circumferentially spaced lobes thereon, said wheels projecting into the interiors of said first and second frames through openings therein, and said lobes so spaced that when said first and second wheels are concurrently driven pairs of adjacent lobes removably and successively engage said first and second balls to move the engaged balls and the balance of said balls and said platform in said predetermined path;

i. first and second channel shaped rigid members that extend about the portions of said first and second frames in which said slots are formed to reinforce the same against the load that may be carried by said platform.

9. A mechanism as defined in claim 8 in which said first slots extend only partially around said frames, and said power means is reversible to permit said balls and platform to be moved in either a first or second direction relative to said frame.

10. A mechanism as defined in claim 8 in which said first and second frames are endless as are said first slots therein and as said power means is actuated said balls and platform successively move through said predetermined path.

11. A mechanism as defined in claim 8 in which said first means are two flanged wheels rotatably supported on said first and second shafts between said first and second brackets and first and second frames, with portions of said flanged wheels extending into said first slots.

* * * * *